April 21, 1942.　　　J. B. HARDER ET AL　　　2,280,407
HEATER CONTROL
Filed Dec. 23, 1940

INVENTORS
JAMES B. HARDER AND
BY　FREDERICK I. STEELE
ATTORNEY

Patented Apr. 21, 1942

2,280,407

UNITED STATES PATENT OFFICE 2,280,407

HEATER CONTROL

James B. Harder, Buffalo, and Frederick I. Steele, Kenmore, N. Y., assignors to Curtiss-Wright Corporation, a corporation of Delaware Application December 23, 1940, Serial No. 371,338

1 Claim. (Cl. 200—53)

This invention relates in general to controls for vehicle heaters and is concerned primarily with improvements in a coincidentally operable fluid valve and electric switch.

There are certain vehicle heaters which utilize a combustion chamber to which a fuel-air mixture is fed where it is ignited electrically. The exhaust from the combustion chamber is discharged to the atmosphere and the heat generated by combustion is transferred to an air or fluid radiator where air is passed thereover by means of a blower. In controlling such a heater unit, it is necessary to turn the blower motor and the electric ignition on and off and at the same time to open and close the fuel delivery conduit to the combustion chamber.

It is apparent of course that separate switch and valve units could be used but it is much more convenient to have both valve and switch units operable from a single element. In connection with valves used in prior devices, conventional stop cocks and the like have been used but have been found unsatisfactory since the slightest leakage of fuel through the valve or its seal volatilizes within the passenger compartment and becomes obnoxious.

It is an object of this invention then to provide a unitary switch and valve arrangement wherein the switch and valve are coincidentally operated by a single plunger element. It is a further object of the invention to provide a special form of valve for the indicated combination which valve shall be free from any possibility of leakage and shall likewise be free from tendencies toward sticking in either an open or closed position.

A further object of the invention is to provide a special valve assembly in which there is no possibility of fluid leakage while permitting of easy manipulation of the valve for opening or closing.

Further objects of the invention will become clear in reading the detailed description below in connection with the drawing, in which.

Figure 1:
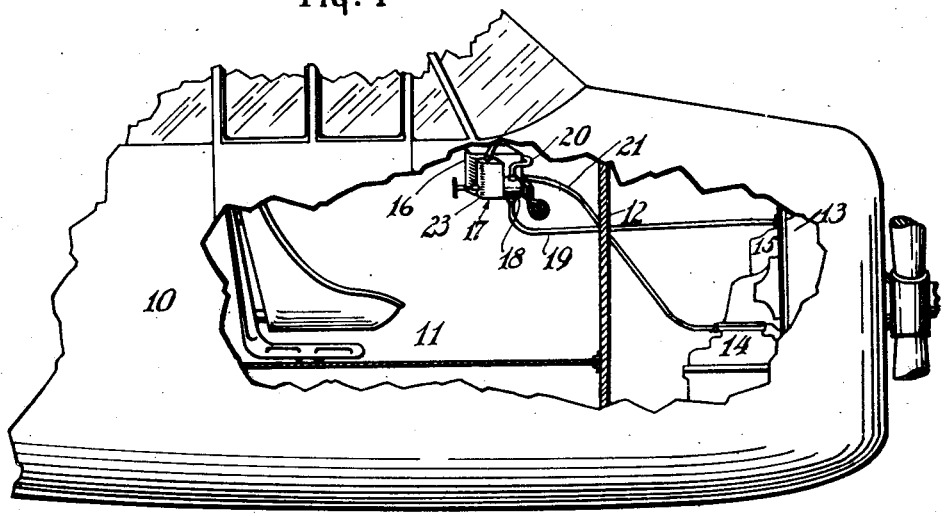
Fig. 1 is a fragmentary view partly sectionalized of an aircraft body incorporating a combustion heater.
Figure 2:
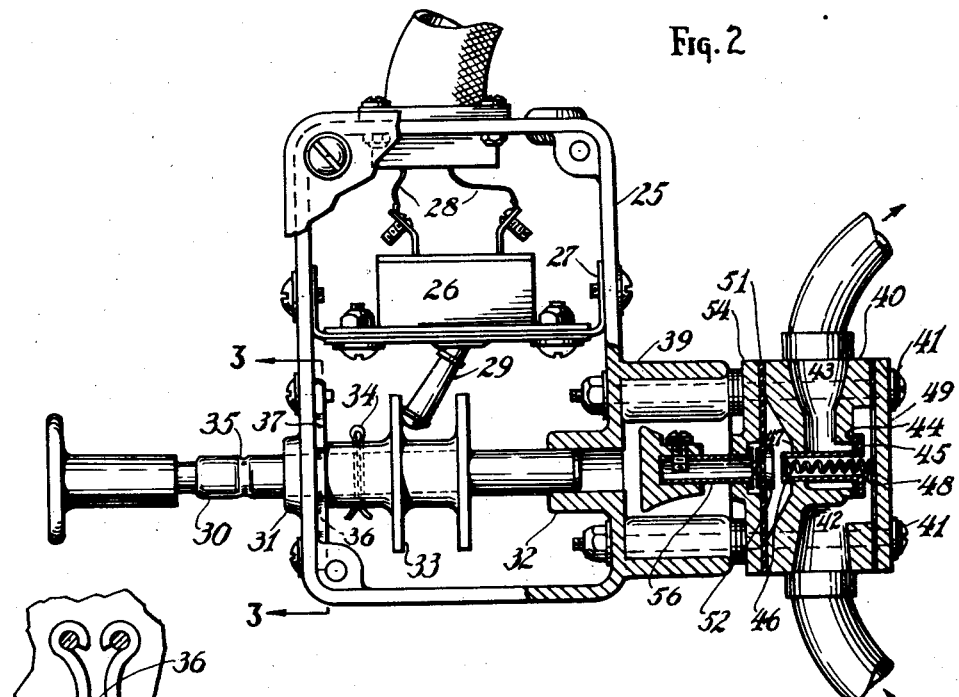
Fig. 2 is an enlarged side elevation, partly in section, of a unitary control for the combustion heater.

Merely for the purpose of showing the environment in which the unitary switch and valve assembly is suitable, Fig. 1 indicates an aircraft body 10 defining a cabin space 11 rearward of a bulkhead 12. The body forward of the bulkhead defines an engine compartment in which is disposed an internal combustion engine 13 having a carburetor 14 and a blower intake housing system part of which is indicated at 15. A combustion heater is indicated at 16 and the unitary control assembly 17 is secured thereto. The rear portion of the control assembly, at 18, is a fluid valve connected through an intake conduit 19 to the engine blower or intake housing 15 and connected by a transfer conduit 20 to the combustion heater. Products of combustion from the heater pass therefrom through a conduit 21 to the engine intake system at 14.

The forward portion of the control unit 17, as at 23, comprises an electric switch through which electrical energy may be carried to the combustion heater ignition system and blower unit, which latter components are not shown in detail.

Figure 3:
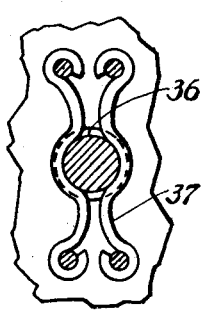
Fig. 3 is a section on the line 3—3 of Fig. 2.

The control unit 17 comprises a box 25 within which a toggle switch 26 is supported on a bracket 27, the toggle switch having electrical leads 28 passing through the top of the box and having a swingable handle 29 extending downwardly therefrom. A plunger 30 passes through the box 25 and is supported therein by bosses 31 and 32. On the plunger is a spool 33, secured by a pin 34, the spool flanges embracing the toggle switch handle 29. Obviously, pushing of the plunger to the right will swing the toggle handle 29 to the right, while pulling of the plunger to the left will move the toggle handle 29 to the left. As arranged in the present embodiment, leftward movement of the plunger will turn the switch 26 off, while rightward movement will turn it on. The plunger 30 is grooved as at 35 and 36 and a pair of opposed spring detents 37 are secured to the switch box 25, as shown in Fig. 3, which springs elastically engage either the groove 35 or 36 to hold the plunger in that axial position to which it may be adjusted.

The righthand side of the switch box 25 is provided with an extension 39 to which a valve housing 40 is secured by screws 41. The valve housing includes an intake port 42 and an exit port 43 between which walls of the housing form a valve seat 44 whose plane is normal to the axis of the plunger 30. A poppet valve rests upon the seat 44 and comprises a valve head 45 and a valve stem 46 piloted in a guide hole 47 in the housing 40. The stem 46 may be drilled out to contain a spring 48 which bears at its left end against the left end of a stem and which bears at its righthand end on a valve housing cover 49 secured by the screws 41 to the housing 40. The spring 48 urges the valve to a closed position. At the left end face of the housing 40 is a diaphragm 51 to the mid-portion of which a bearing button 52 is secured. The diaphragm is attached to the left end face of the housing 40 by a cover member 54 clamped between the housing 40 and the extension 39 by the screws 41. Said cover member 54 also serves to pilot a strut 56 coaxial with the plunger 30 and valve stem 46.

As the plunger 30 is moved to the right, the righthand end of the plunger strikes the lefthand end of the strut 56 moving it to the right until the right end of the strut 56 contacts the button 52 and stretches the diaphragm 51 to the right. Continued movement of the plunger 30 to the right causes the button 52 to contact the end of the valve stem 46 moving it with the valve head 45 to the right to raise the valve from its seat 44 whereupon free passage exists between the fluid conduits 42 and 43. In the extreme rightward position of the plunger 30 the switch 20 will be turned on and the valve 45 will be opened. When the plunger 30 is moved to the left, initial movement will allow closing of the valve 45 under the influence of the spring 48. Thereafter, the diaphragm 51 moves out of contact with the valve stem and the plunger 30 may move on to the left to operate the switch handle 29. Ordinarily, considerably more movement of the switch handle is necessary for turning the switch handle on and off than is needed in opening or closing the valve. Thus, it is only in the righthand position of movement of the plunger 30 that the valve 45 is operated.

In connection with the valve construction, the valve stem 47 may be a free fit in the housing 40, minimizing the possibility of binding of the valve. When the valve is closed, the left end of the stem is free of the button 52 which cannot therefore exert any opening force on the valve. Any leakage of fluid around the valve stem will be stopped by the diaphragm 51 which positively seals the valve housing against leakage whether the valve be open or closed. The diaphragm not only prevents leakage but also serves to transmit valve opening force from the strut 56 to the valve stem 46.

While we have described our invention in detail in its present preferred embodiment, it will be obvious to those skilled in the art, after understanding our invention, that various changes and modifications may be made therein without departing from the spirit or scope thereof. We aim in the appended claim to cover all such modifications and changes.

We claim as our invention:

A substantially coincidentally operable electric switch and fluid valve assembly comprising a switch housing having a toggle switch including an operating lever secured therein, a plunger axially slidable through said housing having spaced arms bracketing the toggle switch lever whereby push and pull on said plunger operates said switch, a valve housing secured to said housing having inlet and outlet ports and a valve seat therebetween, a poppet valve coaxial with said plunger movable into and out of engagement with said seat, the operating movement of said poppet valve being less than the movement of said plunger for switch operation, said poppet valve having a stem projecting through said valve housing toward said plunger, an axially movable device coaxial with said plunger and stem and providing an operating connection between said plunger and said valve stem, said device and plunger being of such length that the major outer part of plunger movement, used in operating said switch, has no effect upon said valve stem, the plunger during the inner minor part of its movement making contact with said device and pressing said device against the valve stem and lifting the poppet valve from its seat, and resilient means urging said valve against its seat.

JAMES B. HARDER.
FREDERICK I. STEELE.